United States Patent [19]

Buckley

[11] Patent Number: 4,630,817

[45] Date of Patent: Dec. 23, 1986

[54] RECREATION APPARATUS

[75] Inventor: James F. Buckley, Marlboro, N.J.

[73] Assignee: Gym Bee Enterprises, Inc., Marlboro, N.J.

[21] Appl. No.: 563,657

[22] Filed: Dec. 20, 1983

[51] Int. Cl.$^4$ ............................................. A63B 69/16
[52] U.S. Cl. .............................. 272/73; 273/DIG. 28; 273/148 B
[58] Field of Search ........ 273/DIG. 28, 85 G, 148 B; 272/73

[56] References Cited

U.S. PATENT DOCUMENTS

| 3,240,947 | 3/1966 | Mass | 290/50 |
| 3,419,732 | 12/1968 | Lane | 307/116 |
| 3,929,335 | 12/1975 | Malick | 272/57 R |
| 4,141,630 | 2/1979 | Emmons | 352/132 |
| 4,278,095 | 7/1981 | Lapeyre | 128/689 |
| 4,298,893 | 11/1981 | Holmes | 358/190 |
| 4,382,166 | 5/1983 | Kim | 273/DIG. 28 |
| 4,489,938 | 12/1984 | Darzinskis | 273/DIG. 28 |
| 4,512,567 | 4/1985 | Phillips | 273/DIG. 28 |

FOREIGN PATENT DOCUMENTS 2822343 11/1979 Fed. Rep. of Germany .
54-159030 12/1979 Japan .

*Primary Examiner*—Leo P. Picard
*Attorney, Agent, or Firm*—Lerner, David, Littenberg, Krumholz & Mentlik

[57] ABSTRACT

A recreation apparatus is disclosed which allows for the operation of a video game apparatus which displays on a television screen one or more video games which include a controllable character and which normally employs a joystick for generating command signals to manipulate the character. The apparatus includes a base, a control rod which is mounted to the base with two degrees of freedom, e.g., rotary displacement of the control rod with respect to the base from an equilibrium position and revolution of the control rod about its own axis from an equilibrium position. A resistance in the form of a spring is provided which impedes movement of the control rod as to both rotary displacement and revolution about its own axis from the equilibrium position. The impedence provided by the spring is sufficient to require the use of substantial muscular exertion by an operator in the play of a video game. A mechanism is provided for continuously sensing the position of the control rod with respect to the two degrees of freedom and transmitting a command signal which reflects the position of the control rod, which signal is recognizable to manipulate the character in a video game. This command signal is thus transmitted to the video game so that the exercise apparatus, in effect, becomes a large joystick which can be used to operate a video game only through strenuous physical exertion.

42 Claims, 6 Drawing Figures

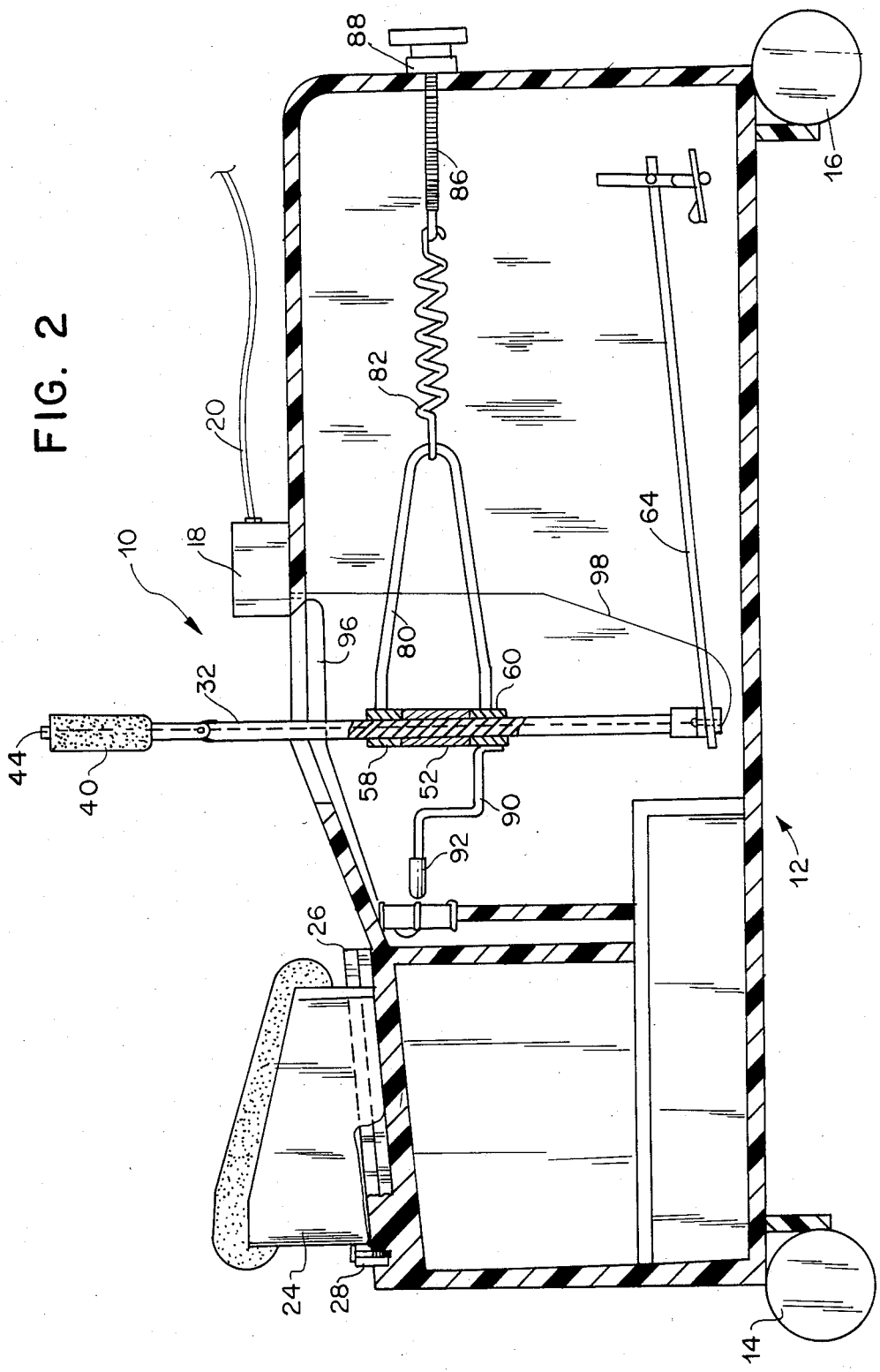

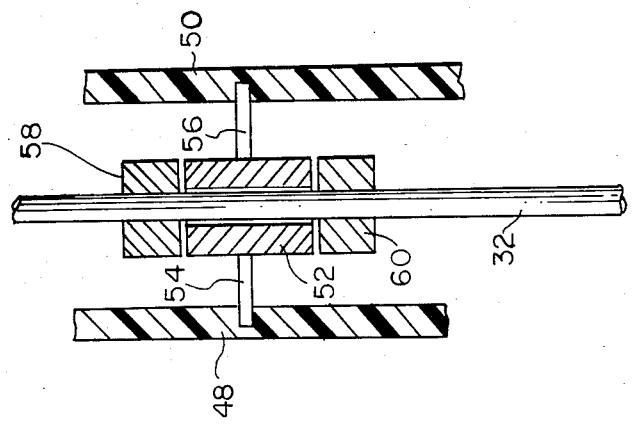
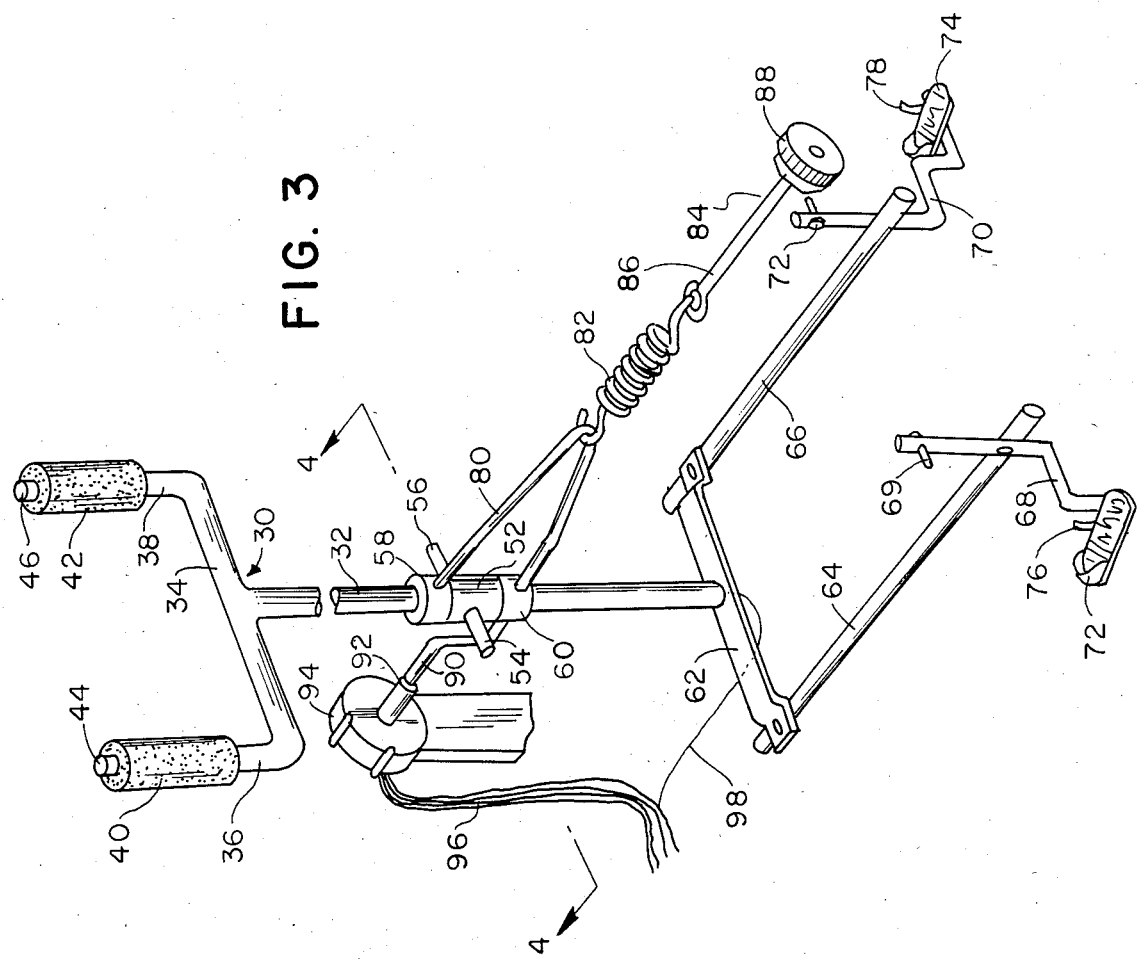

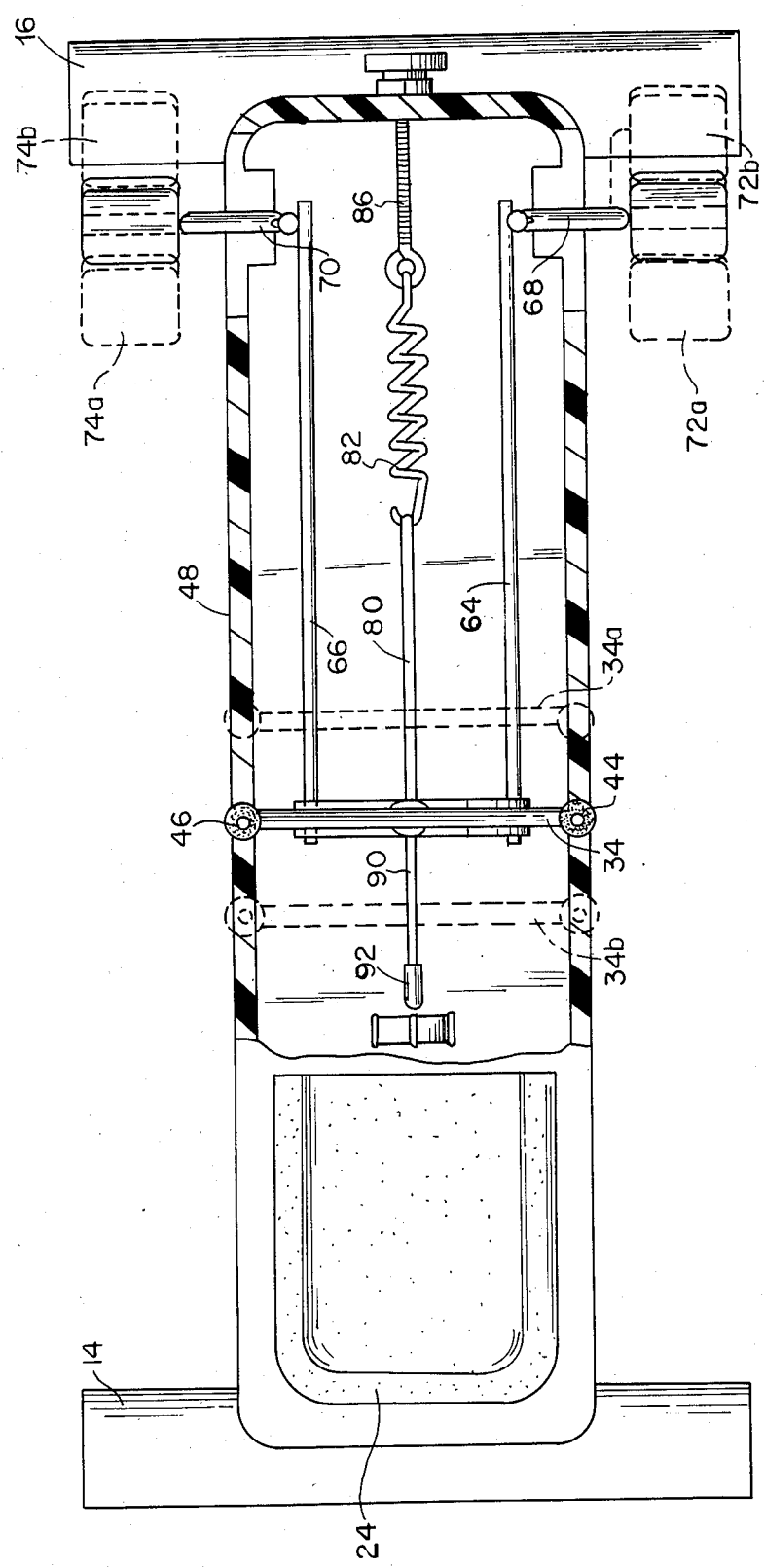

RECREATION APPARATUS

FIELD OF THE INVENTION

The present invention relates generally to exercise devices and more particularly to an improved recreation apparatus which allows an individual to play an otherwise sedentary video game while at the same time requiring vigorous physical exercise to operate the controls for the game.

BACKGROUND OF THE INVENTION

It is difficult to overstate the impact which video games have had during approximately the last decade. The remarkable technological advances which have given rise to video games, particularly those which may be played within the home, have created a phenomenon with few parallels. Video games provide a challenge to one's reflexes which is ever-changing and constantly amusing and entertaining.

For this reason, it is not surprising that many users of video games have become virtually addicted to them and play them for hours on end with little interruption. Indeed, in many localities there has been community opposition to arcade-type video games because adolesents (as well as younger children) play them for extended periods of time, spending significant amounts of money.

As a further matter, the advent of video games comes at a time when the sedentary aspect of the lives of many persons has been well recognized and seriously criticized. Hardly a week goes by without a new book being published on nutrition, exercise or some aspect of physical fitness and health. Indeed, it is almost a paradox of life in the 1980's that, while the need for physical exercise has become recognized, and as technology creates more free time for people, the very same technology has created video games which have had the effect of addicting their followers to spend hours upon hours with their eyes glued to a screen and using no muscles other than the few needed to operate a joystick by hand.

Over the years, various attempts have been made to in some way or other provide physical exercise along with visual stimulation or entertainment. For example, in U.S. Pat. No. 4,298,893 issued to James H. Holmes, an exercise bicycle is linked to what is in effect an electrical generator which provides power to operate a television. Such a device simply forces the operator to tediously pedal away at a velocity sufficient to energize the television set. Nothing the operator does has any effect on the picture being watched, other than to have it go off if the operator goes to slowly or stops completely. Thus, there is clearly no involvement of the operator in the program being watched; nor does the apparatus place any demands on the reflexes and mental faculties of the operator.

In other prior art devices, such as those disclosed in U.S. Pat. No. 3,929,335 in the name of Franklin S. Mallick and U.S. Pat. No. 3,419,732 in the name of Herbert J. Lane, an exercise device must be operated in a particular manner in order to permit operation of another device such as a television set. With systems such as these, the user must operate the equipment in a specified manner in order to activate a switch which then completes a circuit to permit operation of the "motivation" apparatus, such as a television or some other electrical device. Here again, as with the Holmes device described previously, there is no interaction between the operator and the motiviation device; either the operator does the exercise that is required and gets to watch the television, or fails to do so and does not get to watch the television. The challenge is purely physical; the reward is purely pedestrian.

Other prior devices are slightly more sophisticated. For example, in U.S. Pat. No. 4,141,630 in the name of Conant H. Emmons, U.S. Pat. No. 4,278,095 in the name of Pierre A. LaPeyre and Japanese Patent Publication No. 54-159030, a motion display device such as a motion picture projector is operated at a speed which corresponds directly to the speed of the exercise equipment. In U.S. Pat. No. 4,141,630, the user rides a bicycle, and the speed at which time lapse motion pictures are shown is controlled directly in accordance with the speed in which the apparatus is used. In U.S. Pat. No. 4,278,095, the user runs on a treadmill, or operates a cycle or rowing machine, and a video display, corresponding to the type of exercise being performed, is shown on a video screen at a speed corresponding to the speed at which the treadmill, cycle or rowing apparatus is operated by the user. Thus, the video display is simple speeded up as the exercise equipment is operated at a faster rate and, conversely, is slowed down as the equipment is operated at a slower rate. In effect, devices such as these are only slightly less boring than operating a conventional exercise bicycle with a speedometer, in which the faster one goes, the more the needle on the speedometer moves. However, once again, there is no mental challenge or any test of one's reflexes. Such devices merely give the operator what amounts to a visual readout of how fast he is exercising.

Other exercise devices are believed to exist which employ a video screen adapted to show special programs which portray a character doing the same exercise that the operator is doing. For example, the operator may be riding an exercise bicycle, and the screen shows a character riding a bicycle. Such devices are essentially equivalent to the operator watching himself on a closed-circuit television screen or, indeed, in a mirror. There is no challenge other than the physical one. Furthermore, such devices are tied to the use of special programs and are not adapted for use to play the wide variety of existing video games which are presently on the market.

While all the aforesaid devices are useful for those who wish to exercise and to ascertain how hard they are exercising, none of these devices provide a challenge not only to raw physical ability, but to the mind and reflexes as well.

Accordingly, it is an object of the present invention to provide an improved recreation apparatus which challenges not only physical stamina and strength, but mental ability and reflexes as well.

It is a further object of the present invention to provide such an apparatus in which the challenge is constantly changing and in some way different each time the apparatus is used.

It is another object of the present invention to provide a recreation device which is sufficiently entertaining and challenging that it will promote the extensive use of such device and in turn foster further exercising by the operator.

It is an additional object of the present invention to provide such an apparatus which can be used in conjunction with a wide array of commercially available devices to provide a virtually unlimited menu of recreational programs.

Various other objects and advantages of the present invention will become clear from the following detailed description of several exemplary embodiments thereof, and the novel features will be particularly pointed out in conjunction with the claims appended hereto.

SUMMARY OF THE INVENTION

In accordance with the teachings of the present invention, an exercise apparatus is provided for use in conjunction with a video game apparatus of the type which displays one or more games on a screen including a controllable character and which employs a joystick for generating command signals to manipulate such character. The apparatus comprises a base means as well as control rod means movably mounted to the base means so that the control rod means has a plurality of degrees of freedom of movement relative to the base means. Resistance means associated with the control rod means impedes movement of the control rod means within at least one of the degrees of freedom. The resistance means has sufficient impedance to require the use of substantial muscular exertion to be overcome. Means are provided for continuously sensing the position of the control rod means with respect to each of the degrees of freedom and generating a command signal which reflects the position of the control rod means with respect to the degrees of freedom. This signal is recognizable to manipulate a controllable character in an video game apparatus. Means are also provided for transmitting the command signal to the video game apparatus.

Accordingly, in essence, the control rod means serves as the "joystick" of conventional, commercially available games, and the transmitting means is adapted to be connected to the video game in place of the conventional joystick. However, with the present invention, in order to play the video game, the user or operator must engage in substantial physical activity directed against the resistance means, thus obtaining the well-known benefits of physical exercise.

In accordance with a preferred embodiment, the control rod means has a neutral position and the impedance of the resistance means is such that at least one pound of force needs to be exerted by the operator to move the control rod means from the neutral position. Also, preferably the means for sensing is operative to detect a magnitude of movement of the control rod means from the neutral position which exceeds a predetermined limit, which limit is sufficient to require substantial muscular activity of at least one of the operator's arms and legs. while this magnitude of force and limit of movement may not seem great for a single move of the control rod means from the neutral position, it is to be noted that the play of many video games require over 50 changes in direction or manipulations per minute. Thus, in the play of a single video game which may take approximately 10 minutes, the energy which will be expended by the operator will approach, and in some instances exceed, that expended in riding a bicycle or walking for the same period of time.

These and further features and characteristics of the present invention will be apparent from the following detailed description in which reference is made to the enclosed drawings which illustrate a preferred embodiment of the present invention.

BRIEF DESCRIPTION OF THE DRAWINGS

FIG. 2 is a right side sectional view of the exercise apparatus taken along line 2—2 in FIG. 1 and looking in the direction of the arrows;

FIG. 3 is a schematic perspective view showing the control rod means, the resistance means and the sensing means and the relationship therebetween;

FIG. 4 is a fragmented partial front sectional view taken along the line 4—4 in FIG. 3 and looking in the direction of the arrows;

FIG. 5A is a fragmented top plan view of the exercise apparatus particularly illustrating movement of the control rod means along one degree of freedom.

DESCRIPTION OF THE PREFERRED EMBODIMENT

Figure 1:
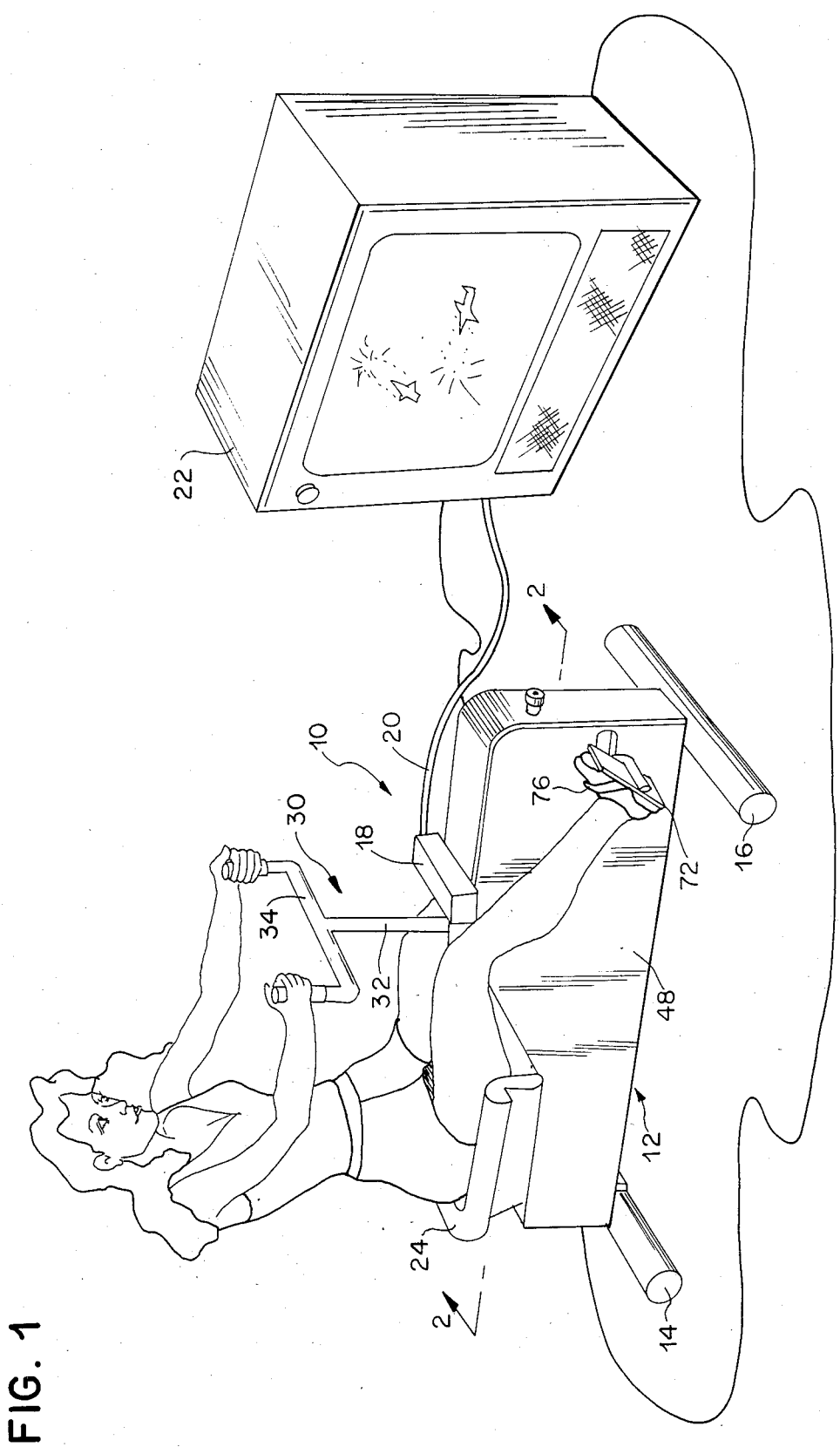
FIG. 1 is a perspective view of a preferred embodiment of an exercise apparatus employing the principles of the present invention and is shown being used with a TV display.

Referring now to the drawings, wherein like reference numerals designate like parts throughout the several views, the present invention is illustrated generally in FIG. 1, wherein the exercise apparatus is referred to generally by reference numeral 10. In accordance with the present invention, the exercise apparatus 10 will be used to play a video game while requiring substantial vigorous exercise to operate the controls for the game.

Prior to explaining the preferred embodiment in detail, it is necessary to first consider the environment in which the recreation apparatus 10 of the present invention is to be used. As is generally known and understood, video games for use in the home typically consist of a playing apparatus into which may be inserted a variety of different game cartridges, discs, cassettes or other memory devices. The playing apparatus is electrically connected to the receiving terminals of a conventional television set. While the variety of video games is almost infinite, it is typical for a game to provide at least one character (be it a human being or an animal or a missile launcher or a bomber or the like) which is capable of being moved about a television screen. Since the screen is two-dimensional, the character typically has two degrees of freedom. It is thus typical to provide a "joystick" which is either attached to the playing apparatus, or is in a separate unit, which generates and transmits a command signal to the screen to manipulate and move the character around in some manner. The joystick can typically be moved within two degrees of freedom which together determines the character's location on the screen. It is also typical for the player to have available to him a shooting mechanism which, on the television screen, may be some sort of firearm or the like. To operate this shooting mechanism, the player is provided with one or more buttons which may be located on the playing apparatus or on the joystick itself or at some other location.

To play a video game in a conventional way, the operator manipulates the joystick, which translates into horizontal and vertical movement of the character on the television screen. The operator also may push the buttons to shoot his weapon or the like.

With this background in mind, the present invention may be better appreciated. As best seen in FIGS. 1 and 2, the exercise apparatus 10 has a base 12 which should be sufficiently heavy, sturdy and rigid to support an operator who, as will be described below, will be exercising vigorously. The base 12 may have affixed thereto tubular members 14, 16 to allow the base 12 to rest on the floor in a satisfactory manner. A video game playing apparatus 18 is also provided and is preferably mounted for convenience to the base 12. It is electrically connected by means of a conventional cable 20 to a conventional television set 22, the cable 20 being affixed in the usual manner. In a central position on the base 12 there is provided a control rod 30 which, as will be appreciated shortly, is used as a joystick for operating the controls of the video game 18.

As best seen in FIG. 2, affixed to the base 12 is a seat 24 which may be movable along a track 26 and tightened through a conventional screw 28 or other similar means. By thus making the seat 24 adjustable, the apparatus 10 may be used by people of widely varying heights. In this regard, it will be noted that the track 26 is slightly inclined so that, as the horizontal position of the seat 24 on the base 12 is changed (i.e., the position relative to the tubular members 14, 16), the elevation or vertical position of the seat 24 is likewise adjusted. This feature is advantageous to insure a relatively confortable position for the operator's arms and legs during use. For instance, for shorter people such as children, the seat 24 will be in a forward raised position (i.e., closer to the front tubular member 16) such that the relative difference in height between the seat 24 and the control rod 30 will be less. Therefore, the angle at which the operator's arms extend toward the control rod 30 will be substantially the same as for taller individuals. In particular, the short statured operator will not find reaching for the control rod 30 to be awkward or uncomfortable.

As can be readily seen in FIG. 3, the control rod 30 of the exercise apparatus 10 includes a central vertical shaft 32 to which is mounted a horizontal member 34 to form a "T". The two ends of the horizontal member 34 have upwardly extending vertical handle portions 36, 38. Mounted to the vertical handle portion 36, 38 are gripping members 40, 42 which may be made of rubber or any other appropriate material which will allow the control rod 30 to be gripped by hand in a comfortable manner. At the top of each of the vertical handle portions 36, 38 is a shooting button or trigger 44, 46.

As can be best seen in FIGS. 3 and 4, the central vertical shaft is mounted within the base 12 (FIG. 2) between internal side walls 48 and 50 (FIG. 4) so that the central vertical shaft 32 is free to revolve or rotate about its own axis and also rotate or pivot about a horizontal axis. In particular, a bearing 52 is provided having an inner diameter slightly greater than the outer diameter of the central vertical shaft 32. Rigidly affixed to the bearing 52 are trunnions 54, 56 which are mounted within internal side walls 48, 50 respectively with bearings (not shown) or in some other well-known manner, so that they may pivot freely. End lugs 58, 60 are affixed to the central vertical shaft 32 by means of a set screw or other conventional means (not shown) to restrain vertical movement of the central vertical shaft 32 as seen in FIG. 4. Thus, the central vertical shaft 32 remains free to revolve about its own axis and also to rotate about a horizontal axis consisting of the trunnions 54, 56, thereby having two degrees of freedom. Means (not shown) may be provided for limiting the movement within either or both degrees of freedom.

Referring again to FIG. 3, rigidly affixed to the bottom of the central vertical shaft 32 is a horizontal bar 62. Pivotally mounted to the ends of horizontal bar 62 are foot control bars 64, 66. The foot control bars 64, 66 are, in turn, pivotally mounted to crank members 68, 70. The crank members 68, 70 are pivotally mounted to the external side walls of the base 12 by studs 69, 71. Pedals 72, 74 are mounted to the exterior portions of the crank members 68, 70. Each of the pedals 72, 74 preferably includes a straps 76, 78 which allows an operator's foot to be inserted therein so that the operator may operate the crank members 68, 70 by either pushing on the pedals 72, 74 or pulling on the straps 76, 78.

The exercise apparatus 10 also includes a centralizer device or means connected to the control rod 30 for yieldably maintaining the control rod 30 in a neutral central position with a suitable resistance so as to require the operator to exert or expend substantial physical energy to move the control rod 30 during play of a video game. As best seen FIG. 2, in the preferred embodiment the centralizer means comprises a substantially V-shaped lever 80 which is rigidly mounted to the end lugs 58, 60 and to which is affixed one end of a tension spring 82 at the "vertex" of the V. The other end of the tension spring 82 is affixed to a spring adjustment mechanism 84 which may consist of a threaded shaft 86 and a knob 88. It can be readily appreciated that by rotating the knob 88 in an appropriate direction, the tension spring 82 may be loosened or tightened. The spring 82 serves to create an impedance or resistance to movement of the control rod 30 from the central neutral position. This impedance or resistance must be overcome by the operator applying a force on the handle portions 36, 38 and/or the foot pedals 72, 74 in order to cause the control rod 30 to move.

Rigidly mounted to one of the end lugs 58, 60, on the side opposite to the side on which the V-shaped lever 80 is mounted, is a position indicator 90 which has at its end a permanent magnet 92. Rigidly affixed to the base 12 is a group of four read switches 94 (FIG. 3), which are spaced apart 90 degrees from each other and each of which is selectively responsive to the magnetic flux of magnet 92 only when the magnet 92 is shifted into the proximity of a respective one of the read switches 94 for creating a respective signal, determined by the position of the magnet 92 and the corresponding rotation or angulation of the shaft 32. The permanent magnet 92 causes the respective read switch 94 to close a corresponding circuit to provide a signal which corresponds directly to the position of the permanent magnet 92 with respect to the switches 94, in a well-known manner which is illustrated, for example, in U.S. Pat. No. 4,389,561 in the name of Klas B. Weman, which is incorporated herein by reference. More particularly, it will be appreciated that when the central vertical shaft 32 revolves about its own axis, the permanent magnet 92 will move to the right or to the left as seen in FIG. 3. Similarly, when the central vertical shaft 32 rotates about the horizontal axis consisting of the trunnions 54 and 56, the permanent magnet 92 will move upwardly or downwardly as seen in FIG. 3. The left-right and up-down movement of the permanent magnet 92, in conjunction with the switches 94, thus generates a signal corresponding to the position of the control rod 30 within the two degrees of freedom of the control rod 30, namely revolution about its own axis and rotation about the horizontal axis. By well know means, the signal thus generated is transmitted by means of cable 96 to the video game playing apparatus 18 (FIG. 2), which receives and utilizes this signal precisely as it receives and utilizes the output from a conventional joystick to manipulate the video game character on the screen of the television set 22 (FIG. 1). Additionally, the signal generated by the buttons 44, 46 (FIG. 3) is also transmitted via a cable 98 (which may advantageously run down and through the central vertical shaft 32) to the playing apparatus 18 (FIG. 2), so that the shooting buttons 44, 46 act as a trigger mechansim for the video game.

It can now be appreciated that the exercise apparatus 10, and in particular the control rod 30, is in effect a gigantic joystick which requires substantial muscular exertion in order for it to be operated. In particular, as seen in FIG. 1, an operator sits on the seat 24 (which may be adjusted to a comfortable position with screw 28 as shown in FIG. 2) and places his or her hands on the gripping members 40, 42 (FIG. 3), preferably placing his or her thumbs on the buttons 44, 46. The operator also places his or her feet on the pedals 72, 74 within the straps 76, 78.

Thus positioned, with the video game playing apparatus 18 and the television set 22 (FIG. 1) properly hooked up and turned on, the operator may play the video game by a large variety of strenuous exercises. In particular, the operator may use his or her arms and hands to simply make the central vertical shaft 32 revolve about its own axis. This can be accomplished by pushing the operator's left arm forward and pulling the right arm backward. Reversing this movement allows revolution of the central vertical shaft 22 to revolve about its own axis in the opposite direction. Such movement will cause the permanent magnet 92 (FIG. 3) to move to the right (when the operator's left hand goes forward) or to the left (when the operator's right hand goes forward).

Additionally, the operator may cause the permanent magnet 92 to move in an upward direction, and thus create corresponding movement of the character on the TV screen, by pushing forward with both arms. This will cause the central vertical shaft 32 to rotate about the horizontal axis defined by the trunnions 54, 56 and thus cause the permanent magnet 92 to move upward. Pulling back with both arms and hands will have the opposite effect and will cause the permanent magnet 92 to move downward.

With respect to each of the movements just described, it can be readily appreciated that the spring 82 impedes the movement of the control rod 30 away from its central equilibrium or neutral position. It requires substantial muscular exertion in the form of a force applied to the handle portions 36, 38 by the operator to overcome this impedance. The degree of exertion needed can be controlled through the spring adjustment mechanism 84 previously described. It will also be appreciated that the single spring 82 mounted in the manner previously described operates to impede movement of the control rod within both degrees of freedom. Because of the V-shaped lever 80, a relatively small angular revolution of the central vertical shaft 32 about its own axis translates into a substantial linear displacement of the "vertex" of the V-shaped lever 80, which can only occur if the spring 82 is extended, requiring substantial muscular exertion. The very same is true about rotation about the horizontal axis consisting of the trunnions 54, 56.

In a similar manner, the apparatus 10 of the present invention can be operated with the operator's legs and feet. For instance, it will be appreciated that pushing with the operator's right leg and foot will cause the foot control bar 64 to move in a direction away from the operator, which will thus cause the central vertical shaft 32 to revolve about its own axis. Similarly, pulling inwardly with the operator's right foot will cause the foot control bar 64 to move in a direction toward the operator, thus creating revolution of the central vertical shaft 32 about its own axis in the opposite direction. It will be readily understood that the same type of movements can be effected with the operator's left leg and foot. Additionally, the foot pedals can be operated to cause rotation of the central control shaft 32 about the horizontal axis consisting of trunnions 54, 56 by simply pushing both legs and feet or pulling with both legs and feet. This will cause both the foot control bars 64, 66 to travel in the same direction and will thus cause the desired rotation.

If the operator desires to use the foot pedals 72, 74 solely to cause revolution of the central vertical shaft 32 about its own axis, it will be appreciated that merely pushing one of the pedals 72, 74 with one leg and foot may have the effect of also causing some degree of rotation about the horizontal axis. To avoid this phenomenon, it is preferable, while pushing with one leg and foot, to pull with the other to create a more pure twisting motion. The same is true with arm and hand operation; if the operator pushes with one arm and hand, he or she should pull with the other arm and hand.

It will be appreciated from the above that the physical exercise benefit obtained with use of the exercise apparatus 10 is dependent on both the amount of force which needs to be applied by the operator in order to overcome the impedance or resistance imposed by the spring 82 and cause the control rod 30 to move, and the magnitude of the movement. In other words, the work or energy expended by the operator is proportional to the magnitude of the force applied and the magnitude of movement of the control rod 30. However, it will also be appreciated that requiring too great a force or too large a movement could effectively inhibit the ability to play the video game, as video games often require quick reaction to cause changes in the movement of the controllable character. Accordingly, in accordance with the perferred embodiment, the magnitude of the force required to move the control rod is preferably on the order of one to thirty pounds, and the magnitude of movement of the control rod 30 from its central neutral position is on the order of three to eight inches. Such limits on the force and magnitude of movement of the control rod 30 will result in substantial muscular exertion in order to play a video game with the consequent benefits of physical exercise begin obtained. While the force and magnitude of movement noted above may not seem great, as video games generally require a large number of changes in direction or manipulations of the controllable character in a short period of time (e.g., on the order of 50 or more changes per minute) substantial physical exercise benefits will be obtained which are comparable to riding a bicycle or walking for the same period of time.

It will also be appreciated that the operator, in order to move the control rod 30, will have to move virtually his entire arms and/or legs, from the shoulders and/or hips, and not just his wrist, hands, ankles or feet. This requirement of substantial muscular activity provides an important physical exercise benefit in that the stomach, and shoulder and hip muscles along the entire arms and legs, will have to be continually flexed or moved during use of the apparatus 10. Thus, use of the exercise apparatus 10 encourages or requires substantial physical exertion, bringing into play a large number of muscles, in order to operate and control the video game. Consequently, the operator will receive a substantial physical exercise benefit while at the same time that he is playing an otherwise sedentary video game.

Figure 5B:
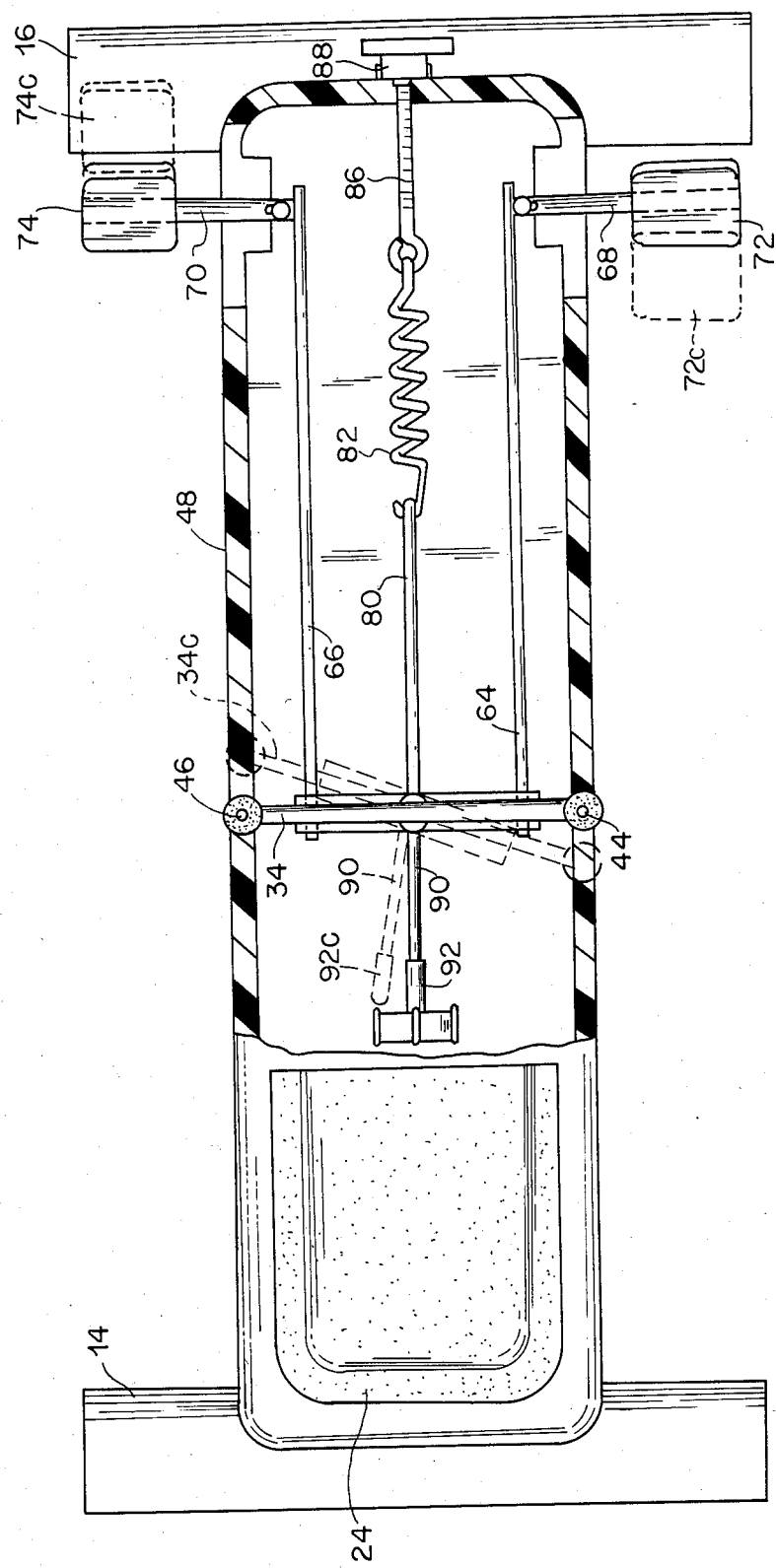
FIG. 5B is a fragmented plan view of the exercise apparatus particularly illustrating movement of the control rod means along a different degree of freedom.

Further in this regard, some of the possible movements which may be required in the use of the apparatus 10 are further illustrated in FIGS. 5A and 5B. FIG. 5A illustrates the mechanisms of the present invention showing various degrees of rotation about the horizontal axis. In particular, the horizontal member 34 shown with normal lines represents the "equilibrium" position of the exercise apparatus 10, which is the position the apparatus will seek by virtue of the tendency of the tension spring 82 to return to its normal or neutral position. The horizontal member 34a shown in phantom as well as the pedals 72a and 74a shown in phantom represent a position corresponding to either pushing forward on the gripping members 40, 42 or pulling rearward with both feet on the pedals 72, 74 by means of the straps 76, 78. Similarly, the horizontal member 34b shown in phantom and the pedals 72b and 74b shown in phantom represent a position in which the gripping members 40, 42 are either pulled together, or the pedals 72, 74 are pushed forward. While not discernible in FIG. 5A, it should be appreciated that when the mechanism is in the position corresponding to reference numerals 34a, 72a and 74a, the permanent magnet 92 is in a high position coming "out of the page" as seen in FIG. 5A. When the components are in the position presented by reference numerals 34b, 72b and 74b, the permanent magnet 92 is in a lower position going down "into the page".

In a similar manner, FIG. 5B illustrates revolution of central vertical shaft 32 about its own axis. Horizontal member 34, as shown with conventional lines, again represents the "equilibrium" position, with the permanent magnet 92 shown in a central location. Pedals 72, 74 are also shown in an equilibrium position with conventional lines. The lines shown in phantom represent revolution of the central vertical shaft in a clockwise direction as seen in FIG. 5B. The horizontal member thus assumes the position 34c while the pedals assume the positions 72c and 74c. This movement causes the permanent magnet to assume the position 92c which is off to one side, or "upward" as seen in FIG. 5B. It will be readily appreciated that the opposite movements will cause the opposite positioning.

As will be readily apparent to those skilled in the art, the present invention may be used in other specific forms of exercise apparatus without departing from its spirit or essential characteristics. By way of example only, the crank members 68, 70 may be shaped differently so that forward movement of a foot causes movement of the foot control bars 64, 66 in the opposite direction as the foot, rather than in the same direction, as has just been described. Similarly, it will also be appreciated that the means for impeding the movement of the control rod 30 may consist of more than one spring or, indeed, need not be a spring at all. Rather, hydraulics, pneumatics, or other resistance means may be used. Also, the present invention could be utilized whereby the movement of the control rod 30 is impeded by frictional drag, so that there would be no equilibrium point of the apparatus at all.

Accordingly, the present embodiments are, therefore, to be considered as illustrative and not restrictive, the scope of the invention being indicated by the claims rather than the foregoing description, and all changes which come within the meaning and range of equivalents of the claims are therefore intended to be embraced therein.

What is claimed is:

1. An exercise apparatus for use in conjunction with a video game apparatus of the type which displays one or more games on a screen including a controllable character and which employs a joystick for generating command signals to manipulate such character, and apparatus comprising:
   base means;
   control rod means movably mounted to said base means so that said control rod means has a plurality of degrees of freedom of movement relative to said base means;
   pedal means connected to said control rod means and adapted to be operated by a user's foot to allow said control rod means to be moved by foot;
   resistance means associated with said control rod means for impeding movement of said control rod means within at least one of said degrees of freedom, said resistance means having sufficient impedance to require the use of substantial muscular exertion to be overcome during play of a video game;
   means for continuously sensing the position of said control rod means with respect to each of said degrees of freedom and generating a command signal which reflects the position of said control rod means with respect to said degrees of freedom and which signal is recognizable to manipulate a controllable character is a video game apparatus; and
   means for transmitting said command signal to the video game apparatus, whereby over a period of time, exertion of considerable physical energy is required to play the video game.

2. The exercise apparatus according to claim 1 wherein said control rod means has an equilibrium position relative to said base means.

3. The exercise apparatus according to claim 2 wherein said resistance means impedes movement of said control rod means away from said equilibrium position.

4. The exercise apparatus according to claim 2 wherein said resistance means urges said control rod means toward said equilibrium position.

5. The exercise apparatus according to claim 2 wherein the impedance of said resistance means is such that at least one pound of force must be exerted by an operator on said control rod means to move said control rod means from said equilibrium position.

6. The exercise apparatus according to claim 2 wherein said means for continuously sensing is operative to detect a magnitude of movement of said control rod means from said equilibrium position which exceeds a predetermined limit, said predetermined limit being sufficient to require substantial muscular activity of at least one of the arms and legs of an operator.

7. The exercise apparatus according to claim 6 wherein said predetermined limit is on the order of from three to eight inches.

8. The exercise apparatus according to claim 2, further including emans for adjusting the magnitude of said impedance of said resistance means.

9. The exercise apparatus according to claim 1 wherein said resistance means comprises a spring connecting said base means to said control rod means.

10. The exercise apparatus according to claim 1 wherein one of said degrees of freedom constitutes revolution of said control rod means about its own axis.

11. The exercise apparatus according to claim 1 wherein said control rod means is pivotally mounted to said base means so that one of said degrees of freedom constitutes rotation of said control rod means with respect to said base means.

12. The exercise apparatus according to claim 11 wherein an additional one of said degrees of freedom constitutes revolution of said control rod means about its own axis.

13. The exercise apparatus according to claim 12 wherein said resistance means comprises a single spring which impedes movement within said one degree of freedom and said additional degree of freedom.

14. The exercise apparatus according to claim 1, further comprising seat means mounted to said base means.

15. The exercise apparatus according to claim 14 wherein the location of said seat means with respect to said base means is adjustable.

16. The exercise apparatus according to claim 15, further including an inclined track on said base means, and wherein said seat means is adjustably mounted on said inclined track.

17. The exercise apparatus according to claim 1, further comprising handle means mounted to said control rod means and adapted to be grasped by at least one of a user's hands to allow said control rod means to be moved by hand.

18. The exercise apparatus according to claim 1, further comprising trigger means for providing an additional on-or-off signal for transmission to said video game with said command signal.

19. The exercise apparatus according to claim 18 wherein said trigger means comprises a button associated with said control rod means.

20. A recreation exercise system comprising:
a video game apparatus of the type which displays one or more games on a screen including a controllable character and which normally employs a joystick for generating command signals to manipulate such character; and
an exercise apparatus, said exercise apparatus including:
base means;
control rod means movably mounted to said base means so that said control rod means has a plurality of degrees of freedom of movement relative to said base means;
foot operated means connected to said control rod means for moving said control rod means by a user's foot;
resistance means associated with said control rod means for impeding movement of said control rod means within at least one of said degrees of freedom, said resistance means having sufficient impedance to require the use of substantial muscular exertion to be overcome;
means for continuously sensing the position of said control rod means with respect to each of said degrees of freedom and generating a command signal which reflects the position of said control rod means with respect to said degrees of freedom and which signal is recognizable to manipulate a controllable character in said video game apparatus; and
means for transmitting said command signal to the video game apparatus as a substitute for the signal normally received from the joystick, whereby, over a period of time, exertion of considerable physical energy is required to play the video game.

21. An exercise apparatus in combination with a video game apparatus which includes display means for displaying a video game including a movable cursor and for showing the progress of the video game and the degree of success of an operator, said exercise apparatus comprising a joystick for controlling said video game apparatus to cause movements of said cursor of said display means, said joystick being shiftable by an operator from a neutral central position; foot operated means connected to said joystick for moving said joystick from said neutral central position; centralizer means connected to said joystick for yieldably holding said joystick in said neutral central position with sufficient resistance to require an operator to exert substantial physical work to move said joystick from said neutral central position during play of said video game; and switch means selectively operable by said joystick upon movement of said joystick from said neutral central position, said switch means being connected to said video game apparatus to control said video game apparatus to move said cursor along first and second directions on said display means, whereby an operator is encouraged to exert considerable physical energy to play the game.

22. The combination according to claim 21 wherein said centralizer means includes adjustment means for changing the resistance of said centralizer means to thereby change the work required to move said joystick.

23. The combination according to claim 21 wherein said centralizer means comprises a spring for yieldably holding said joystick in said neutral central position.

24. The combination according to claim 23, further including adjustment means for changing the tension of said spring to thereby change the force required to move said joystick from said neutral central position.

25. The combination according to claim 21 wherein said joystick comprises at least on handle means engagable by a hand of an operator for moving said joystick from said neutral central position.

26. The combination according to claim 21, further including at least one trigger means and connecting means for connecting said trigger means to said video game apparatus, whereby said video game apparatus may be triggered as required.

27. The combination of claim 21, wherein said joystick is movable in at least two planes from said neutral central position for operating said switch means and controlling said video game apparatus to move said cursor.

28. An exercise apparatus for use in conjunction with a video game apparatus of the type which displays one or more games on a screen including a controllable character and which employs a joystick for generating command signals to manipulate such character, said apparatus comprising:
base means;
control rod means movably mounted to said base means so that said control rod means has a plurality of degrees of freedom of movement relative to said base means;

resistance means associated with said control rod means for impeding movement of said control rod means within at least one of said degrees of freedom, said resistance means having sufficient impedance to require the use of substantial muscular exertion to be overcome during play of a video game, and said resistance means including adjustment means for adjusting the magnitude of said impedance of said resistance means so as to vary the amount of work required to move said control rod means during the play of a video game;

means for continuously sensing the position of said control rod means with respect to each of said degrees of freedom and generating a command signal which reflects the position of said control rod means with respect to said degrees of freedom and which signal is recognizable to manipulate a controllable character in a video game apparatus; and means for transmitting said command signal to the video game apparatus, whereby, over a period of time, exertion of considerable physical energy is required to play the video game.

29. The exercise apparatus according to claim 28 wherein said control rod means has an equilibrium postion relative to said base means and wherein said resistance means urges said control rod means toward said equilibrium position and impedes movement of said control rod means away from said equilibrium position.

30. The exercise apparatus according to claim 29, wherein the impedance of said resistance means is such that at least one pound of force must be exerted by an operator on said control rod means to move said control rod means from said equilibrium position, and wherein said adjustment means is operative to increase the magnitude of said impedance of said resistance means.

31. The exercise apparatus according to claim 30 wherein said resistance means comprises a tension spring connecting said base means to said control rod means, and wherein said adjustment means comprises means for increasing the tension of said spring.

32. The exercise apparatus according to claim 28 wherein said means for continuously sensing is operative to detect a magnitude of movement of said control rod means from said equilibrium position which exceeds a predetermined limit, said predetermined limit being sufficient to require substantial muscular activity of at least one of the arms and legs of an operator.

33. The exercise apparatus according to claim 32 wherein said predetermined limit is on the order of from three to eight inches.

34. An exercise apparatus in combination with a video game apparatus which includes display means for displaying a video game including a moveable cursor and for showing the progress of the video game and the degree of success of an operator, said exercise apparatus comprising a joystick for controlling said video game apparatus to cause movements of said cursor of said display means, said joystick being shiftable by an operator from a neutral central position; centralizer means connected to said joystick for yieldably holding said joystick in said neutral central position with sufficient resistance to require an operator to exert substantial physical work to move said joystick from said neutral central position during play of said video game, said centralizer means including adjustment means for changing the resistance of said centralizer means to thereby change the work required to move said joystick; and switch means selectively operable by said joystick upon movement of said joystick from said neutral central position, said switch means being connected to said video game apparatus to control said video game apparatus to move said cursor along first and second directions on said display means, whereby an operator is encouraged to exert considerable physical energy to play the game.

35. The combination according to claim 34 wherein said centralizer means comprises a tension spring for yieldably holding said joystick in said neutral central position and wherein said adjustment means is operative to change the tension of said spring to thereby change the force required to move said joystick from said neutral central position.

36. The combination according to claim 34 wherein the resistance of said centralizer means is such that at least one pound of force must be exerted by an operator to move said joystick from said neutral central position during play of said video game.

37. An exercise apparatus for use in conjunction with a video game apparatus of the type which displays one of more games on a screen including a controllable character and which employs a joystick for generating command signals to manipulate such character, said apparatus comprising:

base means;

control rod means movably mounted to said base means so that said control rod means has a plurality of degrees of freedom of movement relative to said base means, said control rod means having an equilibrium position relative to said base means;

resistance means associated with said control rod means for impeding movement of said control rod means away from said equilibrium position within at least one of said degrees of freedom, said resistance means being such that at least one pound of force must be exerted by an operator directly on said control rod means to move said control rod means from said equilibrium position during play of said video game;

means for continuously sensing the position of said control rod means with respect to each of said degrees of freedom and generating a command signal which reflects the position of said control rod means with respect to said degrees of freedom and which signal is recognizable to manipulate a controllable character in a video game apparatus; and means for transmitting said command signal to the video game apparatus, whereby, over a period of time, exertion of considerably physical energy is required to play the video game.

38. The exercise apparatus according to claim 37 wherein said means for continuously sensing is operative to detect a magnitude of movement of said control rod means from said equilibrium position which exceeds a predetermined limit, said predetermined limit being sufficient to require substantial muscular activity of at least one of the arms and legs of an operator.

39. The exercise apparatus according to claim 37 wherein said predetermined limit is on the order of from three to eight inches.

40. An exercise apparatus in combination with a video game apparatus which includes display means for displaying a video game including a movable cursor and for showing the progress of the video game and the degree of success of an operator, said exercise apparatus comprising a joystick for controlling said video game apparatus to cause movements of said cursor of said display means, said joystick being shiftable by an operator from a neutral central position; centralizer means connected to said joystick for yieldably holding said joystick in said neutral central position with sufficient resistance so as to require an operator to exert at least one pound of force on said joystick to move said joystick from said neutral central position during play of said video game; and switch means selectively operable by said joystick upon movement of said joystick from said neutral central position, said switch means being connected to said video game apparatus to control said video game apparatus to move said cursor along first and second directions on said display means, whereby an operator is encouraged to exert considerable physical energy to play the game.

41. The combination according to claim 40 wherein said switch means is operative to detect a magnitude of movement of said joystick from said neutral central position which exceeds a predetermined limit, said predetermined limit being sufficient so as to require substantial muscular activity of at least one of the arms and legs of an operator during the play of a video game.

42. The combination according to claim 41, wherein said predetermined limit is on the order of from three to eight inches.

* * * * *